UNITED STATES PATENT OFFICE 2,513,094

CURING OF MEAT TO INHIBIT UNDESIRABLE COLOR CHANGE

George O. Hall, Murrysville, Pa., assignor to Hall Laboratories, Inc., Pittsburgh, Pa., a corporation of Pennsylvania No Drawing. Application June 15, 1945, Serial No. 599,756

13 Claims. (Cl. 99—159)

This invention relates to the curing of meat to inhibit undesirable color change therein, either during the process of curing or after the meat has been cured. The invention relates to all types of cured meat, among which may be mentioned sausage, frankfurters, bologna, ham, bacon, dried beef and cured poultry.

I have found that by employing molecularly dehydrated phosphates such as hereinafter more particularly described in connection with the usual curing agents I am enabled to use a wider and therefore less critical range of curing ingredients, cooking temperatures and pH values of the meat while producing cured meat having the desired color, taste and water-binding properties. The color of cured meat is a very important consideration from the standpoint of the consumer even though an undesirable color is no indication that the meat has spoiled or has become unfit for human consumption.

While the invention is applicable to all kinds of cured meat, it will be described particularly as applied to the manufacture of frankfurters, which is one kind of sausage. Frankfurters are in general prepared as follows:

Lean beef, usually "bull meat" is ground and for each 100 pounds, 3 to 4 ounces of a mixture of potassium nitrate and sodium nitrate known as a "slow cure" are added. On the following day an equal amount of fat pork is ground. The two batches of meat are then mixed and reground together and to this is now added a mixture of sodium nitrate, sodium nitrite, dextrose, salt, spices and, on occasion, powdered milk. During the grinding the temperature is maintained as near 40° F. as possible by the addition of ice. While the maintenance of temperature is not extremely critical, it is best to maintain the temperature as indicated, although a slow rise in temperature is less objectionable than a fluctuating temperature. Under such conditions as result in extreme cold, say an unheated plant in cold weather, more curing salt mixture is added to bring out the color of the finished product. The mixture is stuffed into casings and the frankfurters are placed on racks in a smoking room where they are brought to a temperature of about 140–150° F. During this treatment the color and flavor are enhanced, the meat swells out to fill the casing and some rigidity is obtained. This process may require 30 to 40 minutes or more and thereafter the frankfurters are placed in another chamber in which hot water at a temperature of about 175° F. is sprayed over them for 7 or 8 minutes. They may also be immersed in a tank of water at this temperature. This cooking reduces somewhat the intensity of the red color developed in the smoking room and imparts additional rigidity to the product. Finally the material is removed from the cooking room, cooled, the casings are stripped off in the case of skinless frankfurters, and the product is packed for storage and sale.

From the above brief description it will be seen that the curing of frankfurters is a complex process which must be carried out under rigidly controlled conditions if the desired results are to be obtained. Over-curing (too much curing salt) and/or under-cooking may result in a discolored brown or green product instead of the desired red color sought to be developed in the smoking step. The extent of over-curing is markedly affected by the pH of the frankfurters. If the pH is less than about 6.5, discoloration of the meat by the nitrite may take place. If the pH is appreciably higher than 6.5, the growth of undesirable organisms may take place. The nitrite controls the types of bacteria growth encountered, i. e., it checks the growth of anaerobes and lengthens the lag phase in the growth of aerobic organisms. The relationship between the nitrite and the pH is quite critical. The nitrite must be present in order to develop the desired red color, but if the pH is too high the undesirable organisms will grow in spite of the presence of nitrite and if the pH is too low discoloration of the meat may occur.

Over-curing and over-cooking may result in driving water out of the meat and the meat shrinks away from the casing leaving water pockets. Particularly in the case of skinless frankfurters, a rough and undesirable surface then results when the casings are removed.

I have found that by employing molecularly dehydrated phosphate together with the usual curing agents, the undesirable color change which might otherwise occur in the curing of meats or after curing upon exposure to heat or atmosphere can be entirely eliminated or greatly minimized. By "molecularly dehydrated phosphate" I mean any phosphate which can be considered as derived from a monobasic or dibasic orthophosphate or from orthophosphoric acid or from a mixture of any two of these by elimination of water of constitution therefrom. The molecularly dehydrated phosphates which may be employed according to the present invention have a molar ratio of $R_2O$ to $P_2O_5$ not greater than about 1.7:1, where R represents alkali metal, hydrogen or ammonium or any combination thereof. The molecularly dehydrated phosphate may be either glassy or crystalline. Among the glassy phosphates the commercial product having a ratio of $Na_2O$ to $P_2O_5$ of about 1.1:1 is preferred although any sodium phosphate glass having a molar ratio of $Na_2O$ to $P_2O_5$ not greater than 1.7:1 may be employed even including metaphosphoric acid or $P_2O_5$, provided the pH of the meat is kept at a suitable value by the addition of other materials where necessary.

Among the crystalline phosphates I may employ the water-insoluble sodium metaphosphate or water-insoluble potassium metaphosphate separately, or a mixture of the two. When I use the water-insoluble sodium metaphosphate, I prefer to use with it some or all of the other curing salts, such as nitrate, nitrite and chloride, in the form of potassium salts which exert a solubilizing action on the water-insoluble sodium metaphosphate. When I use the water-insoluble potassium metaphosphate, the sodium nitrate, nitrite and chloride customarily used act to solubilize it. I may employ tripolyphosphates, such as crystalline sodium tripolyphosphate

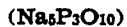

$(Na_5P_3O_{10})$

Pyrophosphates, either the normal pyrophosphates or the acid pyrophosphates are not effective in inhibiting the color changes which may occur in cured meat.

In carrying out the curing process in accordance with my invention, the pH of the meat is preferably maintained between about 6.5 and 7.0 although satisfactory results may be obtained in some instances where the pH is as low as about 6.0 or as high as about 7.5. The amount of molecularly dehydrated phosphate added to the meat amounts to about 0.1% to 0.5% by weight of the meat, the preferred amount being about 0.2%.

Two 500-pound batches of frankfurters were prepared in the manner hereinbefore described. Sodium phosphate glass having a molar ratio of $Na_2O$ to $P_2O_5$ of about 1.1:1 was added to one of the batches in the amount of 0.2% by weight. The other batch was prepared in the same way except that no molecularly dehydrated phosphate was added. Examination of the finished product showed discoloration within four days in the untreated frankfurters while even at the end of two weeks not a single discolored frankfurter was found among those containing the molecularly dehydrated phosphate. Furthermore, the water was held more tenaciously by the phosphate-treated meat than by the meat not containing phosphate.

The invention is useful in preventing discoloration of cured beef. Pieces of beef were treated with a curing solution containing sodium nitrate and sodium nitrite and other pieces of beef were treated with the same curing solution except that it contained 1% by weight of glassy sodium phosphate having a molar ratio of $Na_2O$ to $P_2O_5$ of about 1.1:1. After curing, the two batches of beef were covered with water and heated at 140° F. for 10 minutes. The meat treated with the curing salt solution which did not contain the phosphate discolored, while the meat treated with the phosphate-containing curing solution did not.

As indicated by the examples, the molecularly dehydrated phosphate may be employed in a solid composition of curing agents or in a liquid solution or pickle. The phosphate may be used in conjunction with a nitrite alone, a nitrate alone, or mixtures of nitrite and nitrate. Curing agents usually contain sodium chloride and sugar. The phosphate may be used in connection with any of these or other curing agents. As the nitrite curing agent I may use either sodium or potassium nitrite or mixtures thereof and I may employ either sodium or potassium nitrate or a mixture thereof as the nitrate curing agent.

The invention is not limited to the preferred ingredients or proportions but may be otherwise embodied or practiced within the scope of the following claims.

I claim:
1. The process of inhibiting undesirable color change in cured meat, which comprises curing the meat with a mixture of curing agent and molecularly dehydrated phosphate having a molar ratio of $R_2O$ to $P_2O_5$ not greater than 1.7:1, where R is selected from the group consisting of hydrogen, alkali metal and ammonium.

2. The process of inhibiting undesirable color change in cured meat, which comprises curing the meat with a mixture of curing agent and molecularly dehydrated phosphate having a molar ratio of $R_2O$ to $P_2O_5$ not greater than 1.7:1, where R is selected from the group consisting of hydrogen, alkali metal and ammonium, and maintaining the pH of the meat between about 6 and 7.5 during curing.

3. The process of inhibiting undesirable color change in cured meat, which comprises curing the meat with a mixture of nitrate curing agent and molecularly dehydrated phosphate having a molar ratio of $R_2O$ to $P_2O_5$ not greater than 1.7:1, where R is selected from the group consisting of hydrogen, alkali metal and ammonium.

4. The process of inhibiting undesirable color change in cured meat, which comprises curing the meat with a mixture of a nitrate curing agent, a nitrite curing agent and molecularly dehydrated phosphate having a molar ratio of $R_2O$ to $P_2O_5$ not greater than 1.7:1, where R is selected from the group consisting of hydrogen, alkali metal and ammonium.

5. The process of inhibiting undesirable color change in cured meat, which comprises curing the meat with a mixture of curing agent and glassy molecularly dehydrated phosphate having a molar ratio of $R_2O$ to $P_2O_5$ not greater than 1.7:1, where R is selected from the group consisting of hydrogen, alkali metal and ammonium.

6. The process of inhibiting undesirable color change in cured meat, which comprises curing the meat with a mixture of nitrite curing agent and molecularly dehydrated phosphate having a molar ratio of $R_2O$ to $P_2O_5$ not greater than 1.7:1, where R is selected from the group consisting of hydrogen, alkali metal and ammonium.

7. The process of inhibiting undesirable color change in cured meat, which comprises curing the meat with a mixture of curing agent and glassy sodium molecularly dehydrated phosphate having a molar ratio of $Na_2O$ to $P_2O_5$ not greater than 1.7 to 1.

8. A composition for curing meat, which comprises a nitrate curing agent and molecularly dehydrated phosphate having a molar ratio of $R_2O$ to $P_2O_5$ not greater than 1.7:1, where R is selected from the group consisting of hydrogen, alkali metal and ammonium.

9. A composition for curing meat, which comprises a nitrite curing agent and molecularly dehydrated phosphate having a molar ratio of $R_2O$ to $P_2O_5$ not greater than 1.7:1, where R is selected from the group consisting of hydrogen, alkali metal and ammonium.

10. A composition for curing meat, which comprises a nitrate curing agent, a nitrite curing agent and molecularly dehydrated phosphate having a molar ratio of $R_2O$ to $P_2O_5$ not greater than 1.7 to 1 where R is selected from the group consisting of hydrogen, alkali metal and ammonium.

11. A composition for curing meat which comprises a curing agent and molecularly dehydrated phosphate having a molar ratio of $R_2O$ to $P_2O_5$ not greater than 1.7 to 1, where R is selected from the group consisting of hydrogen, alkali metal and ammonium.

12. A composition for curing meat which comprises a curing agent and glassy molecularly dehydrated phosphate having a molar ratio of $R_2O$ to $P_2O_5$ not greater than 1.7 to 1, where R is selected from the group consisting of hydrogen, alkali metal and ammonium.

13. A composition for curing meat, which comprises a curing agent and glassy sodium molecularly dehydrated phosphate having a molar ratio of $Na_2O$ to $P_2O_5$ not greater than 1.7 to 1.

GEORGE O. HALL.

REFERENCES CITED

The following references are of record in the file of this patent:

UNITED STATES PATENTS

| Number | Name | Date |
|---|---|---|
| 1,966,927 | Fiske | July 17, 1934 |
| 2,054,624 | Griffith | Sept. 15, 1936 |
| 2,081,273 | Guttenberg et al. | May 25, 1937 |
| 2,163,778 | Draisbach | June 27, 1939 |
| 2,207,299 | Mnookin | July 9, 1940 |
| 2,241,868 | Reiman | May 13, 1941 |

FOREIGN PATENTS

| Number | Country | Date |
|---|---|---|
| 536,920 | Great Britain | May 30, 1941 |